United States Patent
Kim et al.

(10) Patent No.: US 10,368,354 B2
(45) Date of Patent: Jul. 30, 2019

(54) CHANNEL STATE INFORMATION FEEDBACK METHOD IN MULTI-ANTENNA WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Kijun Kim, Seoul (KR); Jonghyun Park, Seoul (KR); Bonghoe Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/560,776

(22) PCT Filed: Mar. 24, 2016

(86) PCT No.: PCT/KR2016/002984
§ 371 (c)(1),
(2) Date: Sep. 22, 2017

(87) PCT Pub. No.: WO2016/153287
PCT Pub. Date: Sep. 29, 2016

(65) Prior Publication Data
US 2018/0063826 A1   Mar. 1, 2018

Related U.S. Application Data

(60) Provisional application No. 62/137,834, filed on Mar. 25, 2015.

(51) Int. Cl.
*H04W 72/04*   (2009.01)
*H04B 7/0413*   (2017.01)
*H04B 7/06*   (2006.01)

(52) U.S. Cl.
CPC ........ *H04W 72/046* (2013.01); *H04B 7/0413* (2013.01); *H04B 7/0626* (2013.01); *H04B 7/0695* (2013.01); *H04B 7/0671* (2013.01)

(58) Field of Classification Search
CPC ... H04W 72/046; H04W 16/28; H04W 88/08; H04B 7/0413; H04B 7/0626;
(Continued)

(56) References Cited

U.S. PATENT DOCUMENTS

| 8,290,539 B2 | 10/2012 | Li et al. |
| 8,971,437 B2 * | 3/2015 | Brown ................. H04B 7/0469 375/259 |

(Continued)

FOREIGN PATENT DOCUMENTS

| KR | 10-2013-0075140 A | 7/2013 |
| WO | 2013/125917 A1 | 8/2013 |
| WO | 2014/117748 A1 | 8/2014 |

*Primary Examiner* — Kibrom T Hailu
(74) *Attorney, Agent, or Firm* — Dentons US LLP

(57) ABSTRACT

The present invention relates to a method and apparatus for feeding back channel state information in a wireless communication system supporting a three-dimensional multiple input multiple output (3D-MIMO) antenna. Specifically, the method comprises the steps of: receiving information on N beams, (where N is a natural number), precoded for specific antennas among a plurality of antennas constituting a 3D-MIMO antenna; selecting, from among the N beams, at least one specific beam for which to generate channel state information, and determining interference on the basis of M beams, (where M is a natural number, M≤N−1), among the remaining beams; and generating channel state information for the specific beam on the basis of the interference according to the M beams.

6 Claims, 6 Drawing Sheets

(58) Field of Classification Search
CPC .. H04B 7/0695; H04B 7/0671; H04B 7/0456; H04B 7/0017; H04B 7/0697; H04B 7/0452; H04L 5/0053; H04L 5/023; H04L 5/0048

See application file for complete search history.

(56) References Cited

U.S. PATENT DOCUMENTS

| | | | |
|---|---|---|---|
| 9,319,120 B2* | 4/2016 | Nagata | H04B 7/0456 |
| 2013/0053078 A1* | 2/2013 | Barbieri | H04B 7/024 |
| | | | 455/509 |
| 2014/0003240 A1 | 1/2014 | Chen et al. | |
| 2015/0043439 A1* | 2/2015 | Sajadieh | H04W 76/14 |
| | | | 370/329 |
| 2015/0124736 A1* | 5/2015 | Ko | H04B 7/0626 |
| | | | 370/329 |
| 2015/0222340 A1* | 8/2015 | Nagata | H04W 16/28 |
| | | | 375/267 |
| 2015/0372733 A1* | 12/2015 | Kim | H04B 7/0456 |
| | | | 375/267 |
| 2016/0173180 A1* | 6/2016 | Cheng | H04B 7/0469 |
| | | | 375/267 |
| 2016/0242060 A1* | 8/2016 | Kakishima | H04W 16/28 |
| 2017/0104517 A1* | 4/2017 | Kakishima | H04B 7/0456 |

* cited by examiner (a)

(b)

(a)

(b)

CHANNEL STATE INFORMATION FEEDBACK METHOD IN MULTI-ANTENNA WIRELESS COMMUNICATION SYSTEM AND APPARATUS THEREFOR

This application is a 35 USC § 371 National Stage entry of International Application No. PCT/KR2016/002984, filed on Mar. 24, 2016, and claims priority to U.S. Provisional Application No. 62/137,834, filed Mar. 25, 2015, all of which are incorporated by reference in their entirety herein.

TECHNICAL FIELD

The present invention relates to a wireless communication system, and more particularly, to a channel state information feedback method in a multi-antenna wireless communication system and apparatus therefor.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE (3$^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R.

$$R = E[H_{i,k}^H H_{i,k}]$$

where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an man matrix composed of a plurality of set elements, the matrix H can be represented as a product of three matrices as follows.

$$H_{m \times n} = U_{m \times m} \Sigma_{m \times n} V_{n \times n}^H$$

Here, U and V represent unitary matrices and $\Sigma$ denotes an m×n matrix including a non-zero singular value. The singular value is $\Sigma = \text{diag}(\sigma_1 \ldots \sigma_r)$, $\sigma_i = \sqrt{\Sigma_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

Here, Eigen values can be $\lambda_1, \ldots, \lambda_r$. Information on U between U and V, which indicate channel directions, can be known through singular value decomposition of $HH^H$ and information on V can be known through singular value decomposition of $H^H H$ In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU($\Sigma$)VW. Accordingly, it is desirable to generate the receiving end beam on the basis of U and to generate the transmitting end beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W'=\text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V \Lambda V^H = \sum_{i=1}^{Nt} \sigma_i v_i v_i^H \quad \text{[Equation 2]}$$

Here, the long-term covariance matrix R of the channel matrix H is decomposed into $V \Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{Nt}$).

DISCLOSURE OF THE INVENTION

Technical Task

The technical task of the present invention is to provide a channel state information feedback method in a multi-antenna wireless communication system and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for feeding back channel state information (CSI) by a user equipment (UE) in a wireless communication system supporting a 3-dimensional multiple-input multiple-output (3D-MIMO) antenna, including: receiving information on N beams (where N is a natural number) precoded for specific antennas among multiple antennas constituting the 3D-MIMO antenna; selecting at least one specific beam for generating the CSI from among the N beams and determining interference based on M beams (where M is a natural number, M≤N−1) among the remaining beams; and generating the CSI for the specific beam based on the interference in accordance with the M beams.

Preferably, the N beams may be precoded so that the N beams can be orthogonal to each other.

Preferably, the interference may be determined as multi-user interference.

Preferably, the natural number M may be determined based on information indicated through one of radio resource control (RRC) signaling, medium access control (MAC) control element (CE) signaling or downlink control information (DCI). More preferably, the M beams may be determined with reference to whether the M beams are beams closest to the specific beam. In addition, the M beams may be determined among beams closest to the specific beam in a vertical direction and beams closest to the specific beam in a horizontal direction. Moreover, the M beams may be configured according to a predefined beam set. Further, the M beams may be selected by the UE based on the indicated information. In this case, the method may further include feeding back information on the M beams selected by the UE and the CSI.

Preferably, the number of specific beams may be determined by rank.

In another aspect of the present invention, provided herein is a method for feeding back channel state information (CSI) by a user equipment (UE) in a wireless communication system supporting a 3-dimensional multiple-input multiple-output (3D-MIMO) antenna, including: receiving information on N CSI processes (where N is a natural number) among multiple CSI processes for the 3D-MIMO antenna; selecting at least one specific CSI process for generating the CSI from among the N CSI processes and determining interference based on M CSI processes (where M is a natural number, M≤N−1) among the remaining CSI processes; and generating the CSI for the specific CSI process according to the interference based on the M CSI processes.

Preferably, a different vertical beam may be applied to each of the N CSI processes. More preferably, the method may further include receiving an adjustment value for the CSI.

In a further aspect of the present invention, provided herein is a user equipment (UE) for feeding back channel state information (CSI) in a wireless communication system supporting a 3-dimensional multiple-input multiple-out (3D-MIMO) antenna, including: a radio frequency (RF) unit connected to multiple antennas constituting the full-dimensional antenna; and a processor configured to receive information on N beams (where N is a natural number) precoded for specific antennas among the multiple antennas, select at least one specific beam for generating the CSI from among the N beams, determine interference based on M beams (where M is a natural number, M≤N−1) among the remaining beams, and generate the CSI for the specific beam based on the interference in accordance with the M beams.

Advantageous Effects

According to embodiments of the present invention, a channel state information feedback method in a multi-antenna wireless communication system and apparatus therefor can be provided.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term "base station (BS)" is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on downlink and transmit information to the BS on uplink. The information that the UE transmits or receives includes data and various types of control information. There are many physical channels according to the types and usages of information that the UE transmits or receives.

A description will be given of 3GPP LTE ($3^{rd}$ Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
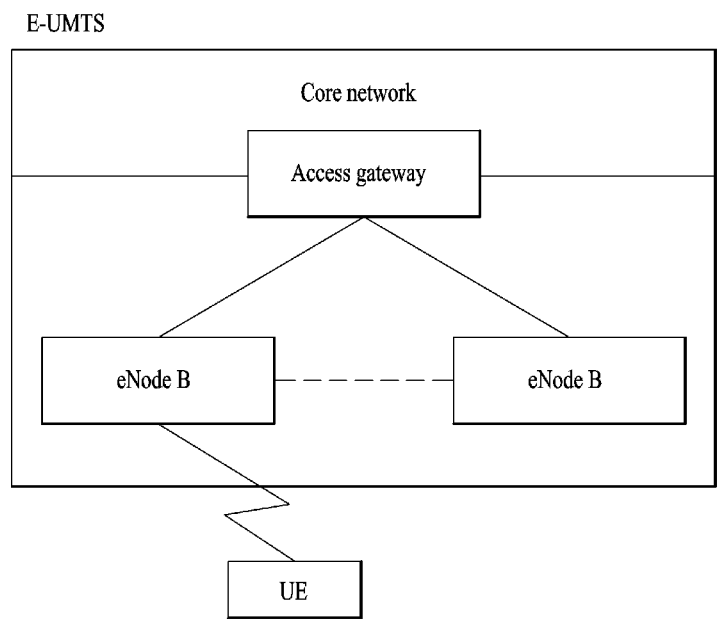
FIG. 1 is a schematic diagram of an E-UMTS network structure as one example of a wireless communication system.

FIG. 1 illustrates E-UMTS (Evolved Universal Mobile Telecommunicaiton System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "$3^{rd}$ Generation Partnership Project: Technical Specification Group Radio Access Network".

Referring to FIG. 1, E-UMTS includes a user equipment (UE), an eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
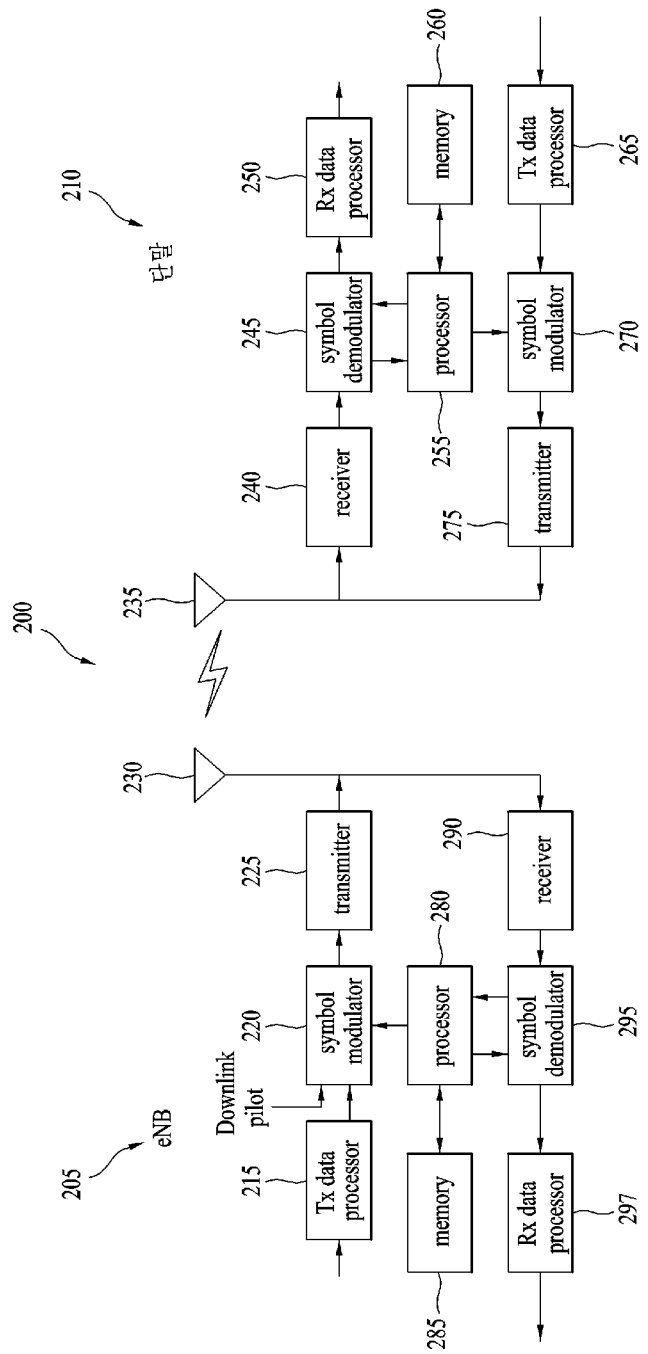
FIG. 2 is a block diagram illustrating configurations of an evolved node B (eNB) and a user equipment (UE) in a wireless communication system according to the present invention.

FIG. 2 is a block diagram illustrating configurations of an eNB 205 and a UE 210 in a wireless communication system 200.

While one eNB 205 and one UE 210 are shown in FIG. 2 to simplify the configuration of the wireless communication system 200, the wireless communication system 200 may obviously include one or more eNBs and/or one or more UEs.

Referring to FIG. 2, the eNB 205 may include a transmission (Tx) data processor 215, a symbol modulator 220, a transmitter 225, a Tx/Rx antenna 230, a processor 280, a memory 285, a receiver 290, a symbol demodulator 295, and an Rx data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. While the antennas 230 and 235 are each shown as a single antenna in the eNB 205 and the UE 210, the eNB 205 and the UE 210 include multiple antennas. Hence, the eNB 205 and the UE 210 support MIMO (Multiple Input Multiple Output). Furthermore, the eNB 205 may support both single user-MIMO (SU-MIMO) and multi-user-MIMO (MU-MIMO) in the present invention.

Moreover, although it is not depicted in FIG. 2, an RF chain corresponds to a part of which a filter and a power amp are combined in an antenna. Specifically, the RF chain can include an RF transmission chain and an RF reception chain. The RF transmission chain includes a DAC (digital-to-analog converter), a mixer for frequency up converting, a PA (power amplifier), a duplexer, and a diplexer. The DAC converts a digital signal into an analog signal in baseband. The mixer multiplies a baseband signal by a carrier to convert the baseband signal into a band-pass signal. The PA raises strength of the band-pass signal. The duplexer plays a role of a filter to distinguish an uplink signal from a downlink signal. The diplexer plays a role of a filter to distinguish (operating) bands different from each other. The RF reception chain includes a diplexer, a duplexer, an LNA (low noise amplifier), a mixer for frequency down converting, and an ADC (analog-to-digital converter). The LNA amplifies strength of a radio signal which is attenuated in the course of transmission. The mixer multiplies a band-pass signal by a carrier to covert the band-pass signal into a baseband signal. The ADC converts an analog signal into a digital signal in a baseband.

On the downlink, the Tx data processor 215 receives traffic data, processes the received traffic data through formatting, coding, interleaving, and modulation (or symbol mapping), and thus outputs modulated symbols ("data symbols"). The symbol modulator 220 processes the data symbols received from the Tx data processor 215 and pilot symbols, thus producing a symbol stream.

More specifically, the symbol modulator 220 multiplexes the data symbols and the pilot symbols and transmits the multiplexed symbols to the transmitter 225. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 converts the symbol stream into one or more analog signals and generates a downlink signal suitable for transmission on a radio channel by additionally processing the analog signals (e.g. amplification, filtering, and frequency upconversion). The downlink signal is transmitted to the UE 210 through the antenna 230.

The UE 210 receives the downlink signal from the eNB 205 through the antenna 235 and provides the received downlink signal to the receiver 240. The receiver 240 processes the downlink signal, for example, through filtering, amplification and frequency downconversion and converts the processed downlink signal into digital samples. The symbol demodulator 245 demodulates received pilot symbols and outputs the demodulated pilot symbols to the processor 255 for use in channel estimation.

The symbol demodulator 245 receives a frequency response estimate with respect to downlink from the processor 255, acquires data symbol estimates (i.e. estimates of the transmitted data symbols) by demodulating the received data symbols using the frequency response estimate and provides the data symbol estimates to the Rx data processor 250. The Rx data processor 250 demodulates the data symbol estimates (i.e. performs symbol demapping), deinterleaves the demodulated data symbols, and decodes the deinterleaved data symbols, thereby recovering the traffic data transmitted by the eNB 205.

The operations of the symbol demodulator 245 and the Rx data processor 250 are complementary to the operations of the symbol modulator 220 and the Tx data processor 215 of the eNB 205.

On the uplink, in the UE 210, the Tx data processor 265 outputs data symbols by processing received traffic data. The symbol modulator 270 multiplexes the data symbols received from the Tx data processor 265 with pilot symbols, modulates the multiplexed symbols, and outputs a stream of the symbols to the transmitter 275. The transmitter 275 generates an uplink signal by processing the symbol stream and transmits the uplink signal to the eNB 205 through the antenna 235.

The eNB 205 receives the uplink signal from the UE 210 through the antenna 230. In eNB BS 205, the receiver 290 acquires digital samples by processing the uplink signal. The symbol demodulator 295 provides uplink pilot symbol estimates and uplink data symbol estimates by processing the digital samples. The Rx data processor 297 processes the data symbol estimates, thereby recovering the traffic data transmitted by the UE 210.

The processors 255 and 280 control, adjust and manage operations of the UE 210 and the eNB 205. The processors 255 and 280 may be connected respectively to the memories 260 and 285 that store program code and data. The memories 260 and 285 store an operating system, applications, and general files, in connection with the processors 255 and 280.

The processors 255 and 280 may also be called controllers, microcontrollers, microprocessors, or microcomputers. The processors 255 and 280 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 255 and 280. When the embodiments of the present invention are implemented using firmware or software, the firmware or software may be configured to include a module, a procedure, a function, etc. which performs functions or operations according to the present invention. The firmware or software may be included in the processors 255 and 280, or stored in the memories 260 and 285 and invoked from the memories 260 and 285 by the processors 255 and 280.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

Multiple Input Multiple Output (MIMO) System

According to the MIMO technology, entire data can be received by combining a plurality of pieces of data received through a plurality of antennas instead of using a single antenna path to receive a whole message. Since the MIMO technology may enhance data transmission rate within a specific range or increase the system range with respect to a specific data transmission rate, the MIMO technology is considered as a next generation mobile communication technology that can be broadly used in mobile communication terminals and relay stations. In addition, this technology is being highly recognized as a promising next generation technology that can overcome the problem of limited transmission amount in the current mobile communication.

FIG. 3(a) is a diagram illustrating a configuration of a general MIMO communication system. As shown in FIG. 3(a), if the number of Tx antennas is increased to $N_T$ and the number of Rx antennas is increased to NR, a theoretical channel transmission capacity is increased in proportion to the number of antennas, unlike the case where a transmitter or receiver uses several antennas. Accordingly, it is possible to remarkably improve a transmission rate and frequency efficiency. As the channel transmission capacity is increased, the transfer rate may also be theoretically increased by a product of a maximum transfer rate RO upon utilization of a single antenna and a rate increase ratio Ri shown in Equation 3 below.

$$R_i = \min(N_T, N_R) \quad \text{[Equation 3]}$$

For instance, assuming that a MIMO communication system uses 4 Tx antennas and 4 Rx antennas, the MIMO system can theoretically acquire a high transfer rate which is four times higher than that of a single antenna system. After this theoretical capacity increase of the MIMO system has been proved in the middle of 90's, many ongoing efforts are made to various techniques to substantially improve a data transmission rate. Some of the above technologies have been reflected in a variety of wireless communication standards, for example, third-generation mobile communication or next-generation wireless LAN, etc.

The trends for the MIMO relevant studies are as follows. First, many ongoing efforts are made in various aspects to develop and research information theory study relevant to MIMO communication capacity calculations in various channel configurations and multiple access environments, radio channel measurement and model derivation study for MIMO systems, spatiotemporal signal processing technique study for transmission reliability enhancement and transmission rate improvement, etc.

Figure 3:
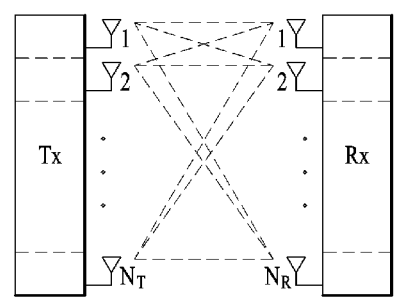
FIG. 3 is a diagram illustrating a structure of a general multi-input multi-output (MIMO) communication system.
Figure 3:
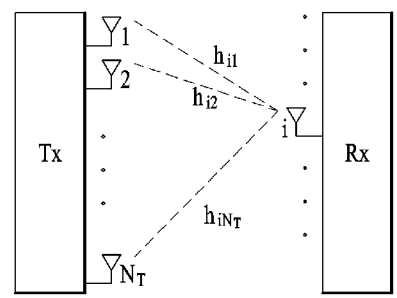

Communication in the MIMO system will be described in detail through mathematical modeling. It is assumed that there are NT Tx antennas and NR Rx antennas as illustrated in FIG. 3 (a). Since up to NT pieces of information can be transmitted through the NT Tx antennas, a transmission signal can be expressed as a vector in Equation 4.

$$S = [S_1, S_2, \ldots, S_{N_T}]^T \quad \text{[Equation 4]}$$

Meanwhile, a different transmit power may be applied to each piece of transmission information, $S_1, S_2, \ldots, S_{N_T}$. If transmit powers are set to $P_1, P_2, \ldots, P_{N_T}$, respectively, the transmission information with adjusted transmit powers can be represented as a vector in Equation 5.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 5]}$$

In addition, ŝ can be represented as Equation 6 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 6]}$$

Assuming a case of configuring NT transmitted signals $x_1, x_2, \ldots, x_{N_T}$, which will be actually transmitted, by applying a weight matrix W to the information vector ŝ having the adjusted transmit powers, the weight matrix W serves to appropriately distribute the transmission information to each antenna according to a transport channel state. The transmitted signals, $x_1, x_2, \ldots, x_{N_T}$ $x_1, x_2, \ldots, x_{N_T}$ can be expressed as shown in Equation 7 using a vector X. In Equation 7, Wij denotes a weight between an ith Tx antenna and jth information and W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 7]}$$

$$W\hat{s} = WPs$$

If there are NR Rx antennas, signals $y_1, y_2, \ldots, y_{N_R}$ received at the antennas can be expressed as a vector in Equation 8.

$$y = [y_1, y_2, \ldots, y_{N_R}]^T \quad \text{[Equation 8]}$$

When channel modeling is performed in the MIMO communication system, channels may be distinguished according to Tx/Rx antenna indexes. A channel from the Tx antenna j to the Rx antenna i is denoted by hij. In hij, it is noted that the indexes of the Rx antennas precede the indexes of the Tx antennas in view of the order of indexes.

The channels can be expressed in the form of a vector or a matrix by combining the channels together. Hereinafter, the vector form is described. FIG. 3(b) shows the channels from the NT Tx antennas to the Rx antenna i The channels from the NT Tx antennas to the Rx antenna i shown in FIG. 3(b) can be expressed as follows.

$$h_i^T = [h_{i1}, h_{i2}, \ldots, h_{iN_T}] \quad \text{[Equation 9]}$$

Accordingly, all channels from the NT Tx antennas to the NR Rx antennas can be expressed as shown in Equation 10 using the matrix form in Equation 9.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 10]}$$

Since an AWGN (Additive White Gaussian Noise) is added to the actual channels after a channel matrix H, the AWGN $n_1, n_2, \ldots, n_{N_R}$ respectively added to the NR Rx antennas can be expressed as a vector shown in Equation 11.

$$n = [n_1, n_2, \ldots, n_{N_R}]^T \quad \text{[Equation 11]}$$

In addition, received signals obtained by using the above Equations can be expressed as shown in Equation 12.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 12]}$$

$$Hx + n$$

Meanwhile, the number of rows and columns of the channel matrix H indicating the channel state is determined by the number of Tx and Rx antennas. The number of rows of the channel matrix H is equal to the number NR of Rx antennas and the number of columns thereof is equal to the number NT of Tx antennas. That is, the channel matrix H is an NR×NT matrix. In general, the rank of the matrix is defined by the smaller of the number of rows and the number of columns, which are independent from each other. Accordingly, the rank of the matrix is not greater than the number of rows or columns. The rank of the channel matrix H can be expressed as shown in Equation 13 below.

$$\text{rank}(H) \leq \min(N_T, N_R) \quad \text{[Equation 13]}$$

MIMO transmission and reception schemes used for operating the MIMO system may include FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between Tx antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as Equation 14 and Equation 15, respectively. Equation 14 indicates a block code in case of 2 Tx antennas and Equation 15 indicates a block code in case of 4 Tx antennas.

$$\frac{1}{\sqrt{2}} \begin{pmatrix} S_1 & S_2 \\ -S_2^* & S_1^* \end{pmatrix} \quad \text{[Equation 14]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 15]}$$

In Equation 14 and Equation 15, Si (i=1, 2, 3, 4) corresponds to a modulated data symbol. In addition, in Equation 14 and Equation 15, a row of a matrix corresponds to an antenna port and a column of the matrix corresponds to time (STBC) or frequency (SFBC).

Figure 4:
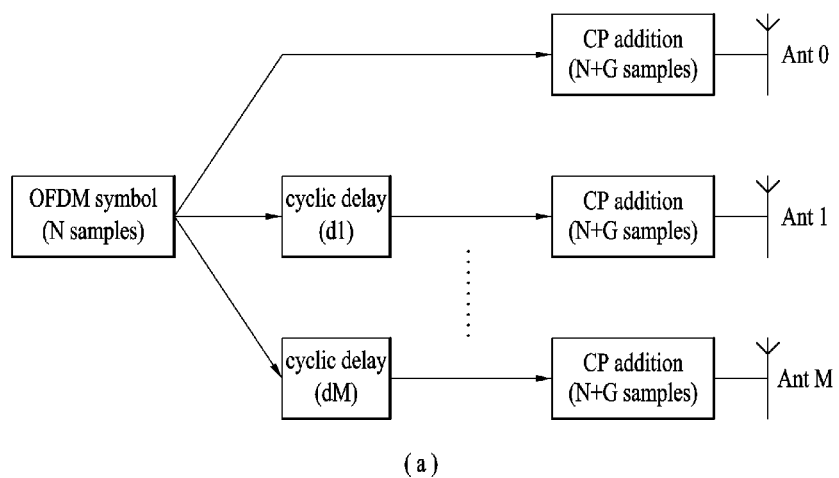
FIG. 4 is a diagram illustrating a general cyclic delay diversity (CDD) structure in a MIMO system.
Figure 4:
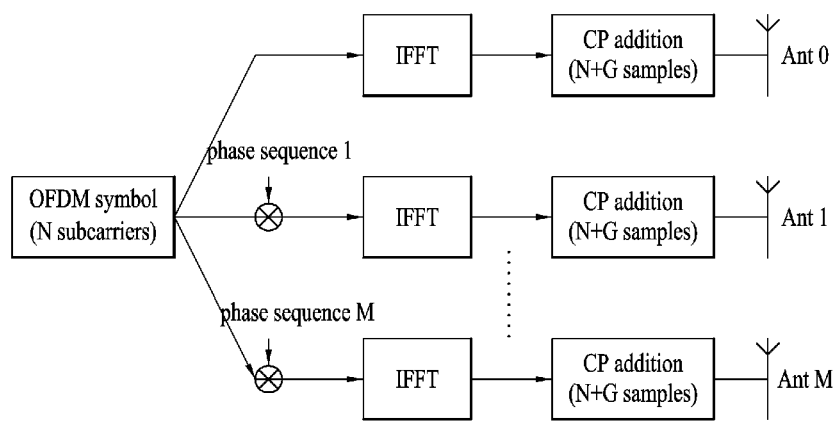

Meanwhile, among the aforementioned MIMO transmission schemes, the CDD scheme corresponds to a scheme of increasing a frequency diversity by increasing delay propagation intentionally. FIG. 4 shows an example of a general CDD structure in a multi-antenna system. Specifically, FIG. 4 (a) shows a scheme of applying cyclic delay in a time domain. The CDD scheme of applying the cyclic delay in FIG. 4 (a) can also be implemented by applying phase-shift diversity as shown in FIG. 4 (b).

Codebook-Based Precoding Scheme

In order to support MIMO transmission, it is possible to apply a precoding configured to appropriately distribute transmission information to each of multiple antennas according to a channel state. According to the codebook-based precoding scheme, a transmitting end and a receiving end determine a set of precoding matrixes in advance, the receiving end (e.g., UE) measures channel information from the transmitting end (e.g., eNB) and provides feedback on a most suitable precoding matrix (i.e., precoding matrix index (PMI)) to the transmitting end, and the transmitting end applies an appropriate precoding to signal transmission based on the PMI.

Since the codebook-based precoding scheme is a scheme of selecting an appropriate precoding matrix from the predetermined set of precoding matrixes, an optimized precoding is not always applied but feedback overhead can be reduced compared to a case of explicitly providing feedback on precoding information optimized for actual channel information.

Figure 5:
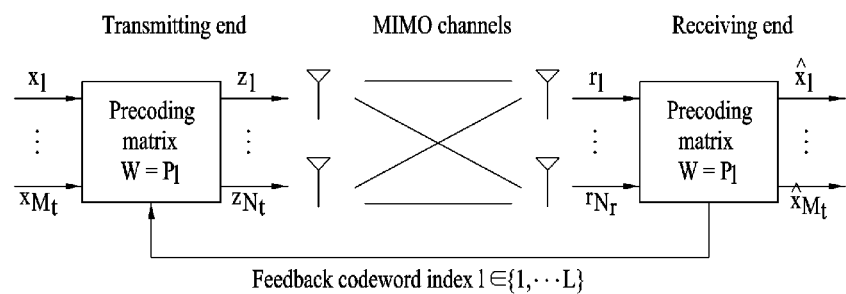
FIG. 5 is a diagram for explaining a basic concept of codebook-based precoding.

FIG. 5 is a diagram for explaining a basic concept of a codebook-based precoding.

When a codebook-based precoding scheme is applied, a transmitting end and a receiving end share codebook information including the prescribed number of precoding matrixes, which are predetermined according to a transmission rank, the number of antennas, and the like. That is, when feedback information is finite, the codebook-based precoding scheme can be used. The receiving end measures a channel state through a received signal and may provide feedback on information on the finite number of preferred precoding matrixes (i.e., an index of a corresponding precoding matrix) to the transmitting end based on the aforementioned codebook information. For instance, the receiving end measures a received signal using an ML (maximum likelihood) scheme or an MMSE (minimum mean square error) scheme and may select an optimized precoding matrix. Although FIG. 5 shows a case that the receiving end transmits precoding matrix information to the transmitting end according to a codeword, the present invention is not limited thereto.

Having received the feedback information from the receiving end, the transmitting end can select a specific precoding matrix from a codebook based on the received information. The transmitting end, which has selected the precoding matrix, performs precoding by multiplying the number of layer signals corresponding to a transmission rank by the selected precoding matrix and may transmit a transmission signal on which the precoding is performed through a plurality of antennas. In a precoding matrix, the number of rows is identical to the number of antennas and the number of columns is identical to a rank value. Since the rank value is identical to the number of layers, the number of columns is identical to the number of layers. For instance, if the number of Tx antennas corresponds to 4 and the number of transmission layers corresponds to 2, a precoding matrix can be configured by a 4×2 matrix. Information transmitted through each layer can be mapped to each antenna through the precoding matrix.

Having received the signal, which is transmitted from the transmitting end by being pre-coded, the receiving end can restore the received signal by performing reverse processing on the precoding. In general, since a precoding matrix satisfies a unitary matrix (U) condition such as $U*U^H=I$, the reverse processing performed on the precoding can be performed using a scheme of multiplying Hermit matrix ($P^H$) of a precoding matrix (P) used by the transmitting end for the precoding by the received signal.

For instance, Table 1 below shows a codebook used for downlink transmission through 2 Tx antennas in the 3GPP LTE release-8/9 and Table 2 below shows a codebook used for downlink transmission through 4 Tx antennas in the 3GPP LTE release-8/9.

TABLE 1

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained from a set $\{s\}$ configured by the equation of $W_n=I-2u_n u_n^H/u_n^H u_n$. In this case, I indicates a 4×4 single matrix and $u_n$ is a value given in Table 2.

As shown in Table 1, in case of a codebook for 2 Tx antennas, it may have a total of 7 precoding vectors/matrixes. In this case, since a single matrix is used for an open-loop system, a total of 6 precoding vectors/matrixes are used for a close-loop system. In addition, in case of a codebook for 4 Tx antennas shown in Table 2, it may have a total of 64 precoding vectors/matrixes.

The aforementioned codebook has a common property such as a CM (constant modulus) property, a nested property, a constrained alphabet property, and the like. The CM property means that each element of all precoding matrixes in a codebook does not include '0' and has the same size. The nested property means that a precoding matrix of a lower rank is configured by a subset of a specific column of a precoding matrix of a higher rank. The constrained alphabet property means that an alphabet of each element of all precoding matrixes in a codebook is configured by $$\left\{\pm 1, \pm j, \pm \frac{(1+j)}{\sqrt{2}}, \pm \frac{(-1+j)}{\sqrt{2}}\right\}.$$

Feedback Channel Structure

Basically, since an eNB is unable to know information on a downlink channel in an FDD (frequency division duplex)

system, the eNB uses channel information fed back by a UE for downlink transmission. In the legacy 3GPP LTE release-8/9 system, a UE can feedback downlink channel information through a PUCCH or PUSCH. In the case of the PUCCH, the PUCCH periodically feedbacks channel information. In the case of the PUSCH, the PUSCH aperiodically feedbacks channel information according to a request of the eNB. In addition, channel information can be fed back in response to the whole of assigned frequency bands (i.e., wideband (WB)) or a specific number of RBs (i.e., subband (SB)).

Extended Antenna Configuration

Figure 6:
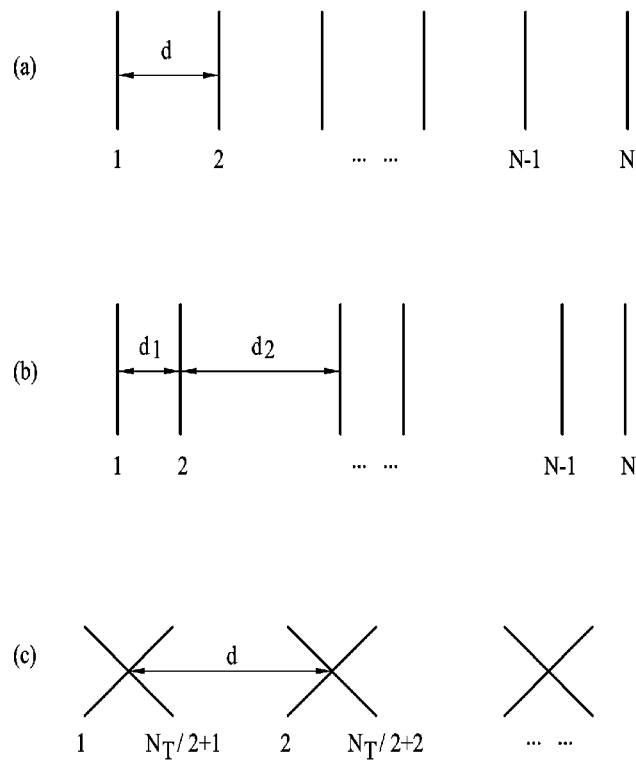
FIG. 6 is a diagram illustrating examples of configuring 8 Tx antennas.

FIG. 6 is a diagram for examples of configuring 8 Tx antennas.

FIG. 6 (a) shows a case that N antennas configure an independent channel without grouping. In general, this case is referred to as an ULA (uniform linear array). If a plurality of antennas are deployed apart from each other, a space of a transmitter and/or a receiver may not be enough to configure channels independent from each other.

FIG. 6 (b) shows an antenna configuration (paired ULA) according to a ULA scheme where two antennas make a pair. In this case, an associated channel may exist between the two antennas making a pair and an independent channel may exist between antennas belonging to a different pair.

Meanwhile, unlike the legacy 3GPP LTE release-8/9 using 4 Tx antennas in downlink, the 3GPP LTE release-10 system may use 8 Tx antennas in downlink. To apply the extended antennas configuration, it is necessary to install many antennas in an insufficient space. Thus, the ULA antenna configurations shown in FIGS. 6 (a) and (b) may not be appropriate for the extended configuration. Therefore, as shown in FIG. 6 (c), it may consider applying a dual-pole (or cross-pole) antenna configuration. If Tx antennas are configured using the dual-pole (or cross-pole) antenna configuration, even though a distance d between antennas is relatively short, it is able to transmit data of high throughput by lowering antenna correlation.

Codebook Structures

As described above, if a predefined codebook is shared between transmitting and receiving ends, it is possible to reduce overhead of the receiving end resulted from making a feedback on precoding information to be used for MIMO transmission of the transmitting end. Hence, the precoding can be efficiently applied.

As an example of configuring a predetermined codebook, a precoder matrix may be configured using a DFT (Discrete Fourier Transform) matrix or a Walsh matrix. Alternatively, various forms of precoders may be implemented by combining the precoder matrix with a phase shift matrix or a phase shift diversity matrix.

If co-polarization antennas are used, a DFT-based codebook can guarantee good performance. In addition, when a DFT matrix-based codebook is configured, an n×n DFT matrix can be defined as Equation 16 below.

$$DFTn:\ D_n(k, l) = \frac{1}{\sqrt{n}} \exp(-j2\pi kl/n),$$
$$k, l = 0, 1, \ldots, n-1$$

[Equation 16]

The DFT matrix shown in Equation 16 exists as a single matrix with respect to a specific size n. Thus, to define various precoding matrixes and appropriately use the various precoding matrixes depending on a situation, it may consider additionally configuring and using a rotated version of a DFTn matrix. Equation 17 below shows an example of a rotated DFTn matrix.

$$rotated\ DFTn:\ D_n^{(G,g)}(k, l) =$$
$$\frac{1}{\sqrt{n}} \exp(-j2\pi k(l+g/G)/n),$$
$$k, l = 0, 1, \ldots, n-1, g = 0, 1, \ldots, G.$$

[Equation 17]

If a DFT matrix is configured as shown in Equation 17, it is possible to generate G rotated DFTn matrixes and the generated matrixes satisfy properties of the DFT matrix.

Hereinafter, a householder-based codebook structure is explained. The householder-based codebook structure means a codebook configured by a householder matrix. The householder matrix is a matrix used for householder transform. The householder transform is a sort of linear transformations and can be used to perform QR decomposition. The QR decomposition is to decompose a matrix into an orthogonal matrix (Q) and an upper triangular matrix (R). The upper triangular matrix means a square matrix where all components below a main diagonal line component are 0. For example, a 4×4 householder matrix can be expressed as shown in Equation 18 below.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$u_0^T = [\ 1\ \ -1\ \ -1\ \ -1\ ]$$

[Equation 18]

It is possible to generate a 4×4 unitary matrix having the CM property by the householder transform. Similar to the codebook for 4 Tx antennas shown in Table 2, an n×n precoding matrix can be generated using the householder transform and it is possible to configure the precoding matrix to be used for rank transmission less than n using a column subset of the generated precoding matrix.

Codebook for 8 Tx Antennas

According to the 3GPP LTE release-10 system where an extended antenna configuration (e.g., 8 Tx antennas) is used, a feedback scheme used in the legacy 3GPP LTE release-8/9 system may be applied by extending the feedback scheme. For example, it is possible to feedback channel state information (CSI) such as an RI (rank indicator), a PMI (precoding matrix index), CQI (channel quality information) and the like. Hereinafter, a description will be given of a method for designing a dual precoder-based feedback codebook capable of being used in a system supporting an extended antenna configuration. To indicate a precoder of the dual precoder-based feedback codebook, which will be used for MIMO transmission at a transmitting end, a receiving end can transmit a precoding matrix index to the transmitting end. A precoding matrix can be indicated by a combination of two different PMIs. That is, if the receiving end feedbacks the two different PMIs (i.e., a first PMI and a second PMI) to the transmitting end, the transmitting end may determine a precoding matrix indicated by the first and the second PMI then apply the determined precoding matrix to the MIMO transmission.

In designing the dual precoder-based feedback codebook, it may consider MIMO transmission performed by 8 Tx antennas, whether single user-MIMO (SU-MIMO) or multiple user-MIMO (MU-MIMO) is supported, suitability of various antenna configurations, a codebook design standard, a codebook size, etc.

In case a codebook is applied to MIMO transmission performed by the 8 Tx antennas, if the codebook is greater than rank 2, SU-MIMO is supported only. If the codebook is equal to or less than the rank 2, a feedback codebook should be designed such that it is optimized for both the SU-MIMO and the MU-MIMO and appropriate for various antenna configurations.

Regarding the MU-MIMO, it is preferred to make UEs participating in the MU-MIMO be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. In addition, in high scattering propagation environment (e.g., indoor environment where there are many reflected waves) capable of generating many spatial channels, a SU-MIMO operation may be more suitable rather than a MIMO transmission scheme. Hence, a codebook for a rank greater than rank-2 needs to be designed to have good performance in identifying multiple layers.

When designing a precoder for MIMO transmission, it is preferred to make a precoder structure have good performance in response to various antenna configurations (low correlation, high correlation, cross-polarization, and the like). When 8 Tx antennas are arranged, it is possible to configure a cross-polarization array having 4λ antenna space as a low-correlation antenna configuration, a ULA having 0.5λ antenna space as a high-correlation antenna configuration, or a cross-polarization array having 0.5λ antenna space as a cross-polarization antenna configuration. In addition, a DFT-based codebook structure can provide good performance in response to the high-correlation antenna configuration.

Meanwhile, block diagonal matrixes may be more suitable for the cross-polarization antenna configuration. Thus, if a diagonal matrix is applied to a codebook for 8 Tx antennas, it is possible to configure a codebook capable of providing goof performance with respect to all antenna configurations.

As described above, the codebook design standard needs to satisfy a unitary codebook, a CM property, a constrained alphabet property, an appropriate codebook size, a nested property and the like. This standard has been reflected in the 3GPP LTE release-8/9 codebook design. In addition, it may be considered that the codebook design standard is reflected in the 3GPP LTE release-10 codebook design supporting an extended antenna configuration as well.

Regarding a codebook size, it is necessary to increase the codebook size to sufficiently support advantages obtained by using the 8 Tx antennas. To obtain a sufficient precoding gain from the 8 Tx antennas in a low correlation environment, a large size of a codebook (e.g., a codebook with a size greater than 4 bits with respect to rank 1 and rank 2) may be required. In addition, a 4-bits size of a codebook may be enough to obtain a precoding gain in a high correlation environment. However, to achieve a multiplexing gain in the MU-MIMO, the codebook size for the rank 1 and the rank 2 can be increased.

Based on the above discussion, the present invention proposes to a method performed by a UE for feeding back channel state information (CSI) in a MU-MIMO environment as a technology for three-dimensional (or full-dimensional) multiple-input multiple-out (3D-MIMO).

After LTE Rel-12, an antenna system utilizing an adaptive antenna system (AAS) has been considered. Since each antenna included in the AAS corresponds to an active antenna including an active circuit, an antenna pattern can be changed depending on a situation. Thus, it is expected that the AAS is more efficient in reducing interference or performing beamforming. Moreover, if the AAS is established in two dimensions (i.e., 2D-AAS), it is possible to adjust a main lobe of each antenna not only in the horizontal direction as in the related art but also in the vertical direction in terms of the antenna pattern. Thus, the beam adaptation can be performed more efficiently in three dimensions. Based on the above beam adaptation, it is possible to actively modify a transmitted beam depending on a location of a UE. Accordingly, it is expected that the 2D-AAS is established as a system having multiple antennas in a manner of arranging antennas vertically and horizontally as shown in FIG. 7.

Figure 7:
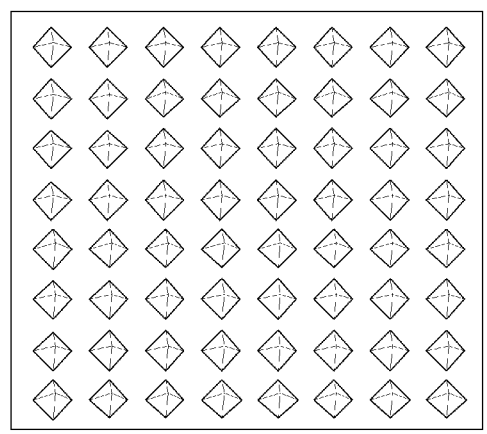
FIG. 7 is a diagram illustrating an active antenna system (AAS) according to the present invention.
Figure 8:
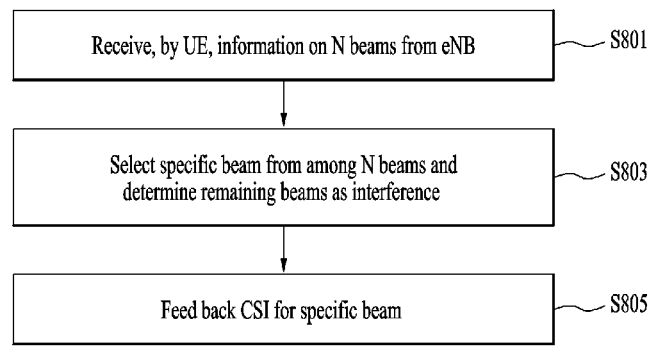
FIG. 8 is a flowchart for explaining a channel state information feedback method according to an embodiment of the present invention.

When the 2D-ASS is introduced as shown in FIG. 7, since a large number of antennas are additionally installed in a vertical antenna domain, it is expected that the number of antennas is remarkably increased. To manage such a large number of the antennas, reference signal (RS) design for measuring a channel at each antenna and feedback design for a UE to provide feedback of channel information between each antenna and the UE becomes very important. The reason for this is that as the number of antennas increases, RS overhead and feedback overhead increases either linearly or exponentially.

Hereinafter, details of the RS design will be first described. In the current LTE system, a CSI-RS is assigned using REs (resource elements) corresponding to the number of antenna ports in each PRB pair. If 64 antennas are used as shown in FIG. 7 and an RS is designed similar to that of the current LTE system, 64 REs need to be used for the CSI-RS in each PRB pair. In addition, in the case of the normal CP, even considering that 168 REs are present in the PRB pair, too many REs are used for the RS. Moreover, in this case, REs that can be used for transmitting actual data are significantly insufficient in consideration of control channels and other RSs.

To solve this problem, a method of transmitting a precoded RS can be used. For example, assuming that a UE needs to be informed that there are 64 antenna elements and each of the 64 antenna elements is used as an antenna port, it may cause extremely large overhead. Thus, a method for reducing the amount of RS overhead and feedback has been proposed. According to the proposed method, precoding is applied to N antenna elements (where N is a positive integer smaller than 64) among the 64 antenna elements, and precoded N beams are informed the UE. Thereafter, the UE performs scheduling within the indicated N beams, whereby the amount of RS overhead and feedback can be reduced. In this case, an eNB can obtain gains from the degree of freedom of the 64 antennas by changing the N beams depending on time.

Hereinafter, a method performed by a UE for feeding back CSI by assuming multiple users when an eNB transmits a precoded RS to the UE will be described in detail with reference to a first embodiment.

First Embodiment

First, an eNB informs N beams to a UE. That is, the UE receives information on the N beams from the eNB [S801].

In this case, for example, the N beams can be indicated to the UE through an N-port CSI-RS. The eNB may generate the N beams using orthogonal precoding for smooth beam separation.

The UE selects a specific beam most suitable (preferred) for itself (e.g., one specific beam) from among the N beams [S803]. When selecting the most suitable specific beam, the UE can assume that data is transmitted to itself through the selected specific beam and the remaining (N−1) beams act as interference (e.g., multi-user interference) (in this case, the UE can assume that the same power is transferred through the respective beams).

For example, assuming that the eNB indicates four beams and channels formed by the beams are $h_{P1}$, $h_{P2}$, $h_{P3}$, and $h_{P4}$, a received signal can be expressed as shown in Equation 19.

$$y = h_{P1}s_1 + h_{P2}s_2 + h_{P3}s_3 + h_{P4}s_4 + n \quad \text{[Equation 19]}$$

In Equation 19, $s_1$, $s_2$, $s_3$, and $s_4$ are assumed to be data transmitted through the respective beams. In this case, if $h_{P2}$ is a channel of the selected beam, the UE may perform beam selection or CQI calculation by assuming that data for the UE is transmitted through $s_2$ and channels formed by the remaining beams, i.e., $h_{P1}$, $h_{P3}$, and $h_{P4}$ act as interference.

By doing so, the UE may feed back the selected beam or CQI to the eNB [S805].

Although in the first embodiment, the number of beams considered as interference (e.g., multi-user interference) is assumed to be N−1, the present invention is not limited thereto. Specifically, the eNB can set the number of the beams considered as the interference to N' (where N'≤N−1) and then inform the UE of it through RRC signaling (or medium access control (MAC) control element (CE) signaling or DCI signaling). If there is no separate RRC signaling (or MAC CE signaling or DCI signaling), N' can be assumed to be (N−1).

When N' is signaled through the RRC signaling (or MAC CE signaling or DCI signaling), the UE may consider beams closest to the specific beam (i.e., beams with indices/numbers before and after an index/number of the specific beam) as interference. For example, among the N beams, indices/numbers before and after the last beam index/number N are assumed to be (N−1) and 1. If a beam considered as interference has an index/number i (it is assumed that a beam index/number starts from 1 and increases in ascending order), the interference beam can be expressed as shown in Equation 20.

$$\left(\left(i - \left\lceil \frac{N'}{2} \right\rceil + k \right) \bmod N \right) + 1 \quad \text{[Equation 20]}$$

(where k has any value among −1, 0, 1, 2, 3, . . . , N' except 1 or any value among 0, 1, 2, 3, . . . , N', N'+1 except 1)

For example, if the eNB informs the UE of four beams, i.e., beams 1, 2, 3, and 4 and sets N' to 2 and if the UE selects the first beam as a beam to be used for the corresponding UE, the UE may consider the fourth and first beams as interference. As another example, if the UE selects the second beam as the beam to be used for the corresponding UE, the UE may consider the first and third beams as interference.

When N' is signaled through the RRC signaling (or MAC CE signaling or DCI signaling) and a beam to be used for data transmission has a number i (it is assumed that a beam number starts from 1 and then sequentially increases as 1, 2, 3, 4, . . . ), the UE can consider N' beams, i.e., (i mod N)+1, ((i+1) mod N)+1, . . . , ((i+N'−1) mod N)+1 as interference. For example, if the eNB informs the UE of four beams, i.e., beams 1, 2, 3, and 4 and sets N' to 2 and if the UE selects the third beam as a beam to be used for the corresponding UE, the UE may consider the fourth and first beams as interference (e.g., multi-user interference). As another example, if the UE selects the first beams as the beam to be used for the corresponding UE, the UE may consider the second and third beams as interference.

When N' is signaled through the RRC signaling (or MAC CE signaling or DCI signaling), the eNB may inform the UE which set of beams should be considered as interference through the RRC signaling (or MAC CE signaling or DCI signaling).

As another method, after a set of beams is indicated through the RRC signaling (or MAC CE signaling or DCI signaling), beams with indices/numbers except an index/number of the beam to be used for data transmission within the set can be considered as interference. For example, if the N beams are composed of beams 1, 2, 3, 4, 5, 6, 7, and 8, set#1 may include beams 1, 3, 5, and 7 and set#2 may include beams 2, 4, 6, and 8. In this case, if the set#2 is indicated to a certain UE, the UE may select a beam for its data from among the beams 2, 4, 6, and 8 and consider the remaining beams as interference.

Further, when N' is signaled through the RRC signaling (or MAC CE signaling or DCI signaling), the UE may directly select interference beams and then feed back information on the selected interference beams and a CQI where the selected interference beams are reflected.

Second Embodiment

In the first embodiment, UE operation is described on the assumption of rank 1. In the second embodiment, rank 2 or higher is assumed.

First, the UE selects M beams suitable for itself from among the N beams (M≤N). When selecting the M suitable beams, the UE can assume that the M selected beams are used for carrying data for itself and the remaining (N−M) beams act as interference (in this case, the number of cases in which the M beams are selected is $_NC_M$ where C is a combination operation). In some cases, beam combinations smaller than $_NC_M$ are predefined for each value of M corresponding to the number of selected beams. For example, assuming that the eNB indicates four beams, the number of cases in which two beams are selected is $_4C_2=6$. Specifically, beam combinations of (1,2), (1,3), (1,4), (2,3), (2,4), and (3,4) are generated. Among these beam combinations, only the beam combinations of (1,2) and (3,4) can be assumed.

Alternatively, several sets of beam combinations can be predefined for the beam combination. In this case, the eNB may select a specific set from among the predefined multiple beam sets and then inform the UE of the selected specific set through the RRC signaling (or MAC CE signaling or DCI signaling). For example, after predefining sets of {(1,2), (3,4)} and {(1,3), (2,4)}, the eNB may inform the UE of a specific set through the RRC signaling (or MAC CE signaling or DCI signaling).

In addition, the eNB may configure that orthogonal precoding is applied to the beam combinations and the UE may assume that the orthogonal precoding is applied. For example, in the case of the beam combination (1,2), the eNB applies the orthogonal precoding to the beams 1 and 2 and then the UE assumes that the orthogonal precoding is applied to the beams 1 and 2 in the combination. Alternatively, the eNB may inform the UE whether the orthogonal precoding is applied to the beam combination through the RRC signaling (or MAC CE signaling or DCI signaling).

Hereinafter, details of the second embodiment are described with reference to a particular example. Assuming that the eNB indicates four beams and channels formed by the beams are $h_{P1}$, $h_{P2}$, $h_{P3}$, and $h_{P4}$, a received signal can be expressed as shown in Equation 21.

$$y = h_{P1}s_1 + h_{P2}s_2 + h_{P3}s_3 + h_{P4}s_4 + n \qquad \text{[Equation 21]}$$

In Equation 21, $s_1$, $s_2$, $s_3$, and $s_4$ are assumed to be data transmitted through the respective beams. In this case, if $h_{P1}$ and $h_{P2}$ are channels of beams selected as the rank 2, the UE may perform beam selection or CQI calculation by assuming that data for the UE is transmitted through $s_1$ and $s_2$, and channels formed by the remaining beams, i.e., $h_{P3}$ and $h_{P4}$ act as interference.

By doing so, the UE may feed back the number of selected beams, the selected beams or a CQI to the eNB.

Although in the second embodiment, the number of beams considered as interference (e.g., multi-user interference) is assumed to be (N–M), the present invention is not limited thereto. Specifically, the eNB can inform the UE of the sum N" (N"≤N) of the number of beams used for data transmission and the number of beams considered as interference through the RRC signaling (or MAC CE signaling or DCI signaling). If there is no separate RRC signaling, N" can be assumed to be N.

In addition, when N" is signaled through the RRC signaling (or MAC CE signaling or DCI signaling), the eNB may inform the UE which beams should be considered as interference in each combination of beams for data through the RRC signaling (or MAC CE signaling or DCI signaling).

As another method, after a set of beams is configured through the RRC signaling (or MAC CE signaling or DCI signaling), the remaining beams with indices/numbers except an index/number of the beam to be used for data transmission within the set can be considered as interference. For example, if the N beams are composed of beams 1, 2, 3, 4, 5, 6, 7, and 8, set#1 may include beams 1, 3, 5, and 7 and set#2 may include beams 2, 4, 6, and 8. In this case, if the set#2 is configured for a certain UE, the UE may select beams for its own data from among the beams 2, 4, 6, and 8 and consider the remaining beams as interference. For example, the UE may select the beams 2 and 8 and the remaining beams 4 and 6 as the interference.

Further, when N" is signaled through the RRC signaling (or MAC CE signaling or DCI signaling), the UE may directly select interference beams and then feed back information on the selected interference beams and a CQI where the selected interference beams are reflected.

Hereinafter, the present invention is described in terms of CSI processes. An eNB configures N CSI processes for a UE. In this case, a single CSI process is configured with a single CSI-RS and a single CSI-IM for interference measurement. For example, a different vertical beam may be applied to each CSI process. The UE selects a CSI process most suitable for itself from among the N CSI processes, an RI according to the selected CSI process, and the best PMI (in this case, the RI may be fixed to a specific value). When selecting the CSI process index, RI and best PMI, the UE may also select the worst PMI that is expected to work as the greatest interference to itself by assuming that processes except the CSI process to be selected are used by other UEs and rank is 1. Based on the selected worst PMI, the UE can calculate a CQI.

Third Embodiment

To select the CSI process most suitable for the corresponding UE from among the N CSI processes, the UE may need to calculate the RI, PMI, and CQI in each CSI process. In this case, the UE considers the CSI process to be selected as that for a channel for carrying its own data and the other (N–1) CSI processes as those for channels for carrying data of other UEs.

In this case, the UE assumes that the other UEs use rank 1 in CSI processes having indices except the CSI process index to be selected and the worst PMI works as the greatest interference to itself. (in addition, the UE can assume that the same power is transferred for the respective CSI processes).

For example, assuming that the eNB configures CSI processes 1, 2, 3, and 4 for the UE, the UE may consider the CSI process 1 as that for a channel for receiving its data and consider each of the CSI processes 2, 3, and 4 as interference with rank 1. Subsequently, the UE may calculate the RI, PMI, and CQI of the CSI process 1 by assuming that the PMI that is expected to work as the greatest interference will be applied to the CSI processes 2, 3, and 4. Thereafter, the UE may calculate the RI, PMI and CQI of each of the CSI processes 2, 3, and 4 in the same manner and then feed back the index of the CSI process most suitable for the corresponding UE and the RI, PMI, CQI thereof to the eNB.

Alternatively, instead of selecting the worst PMI for interference, the UE may consider an average value of PMIs where the rank 1 is assumed as interference of each CSI process. This is because when the worst PMI is assumed, the CQI may indicate an extremely low value.

According to the third embodiment, when the eNB does not use all the beams where the CSI processes are applied, an SINR occurring in actual data transmission may be much greater than that of the CQI calculated by the UE. To adjust it, the eNB may semi-statically inform the UE of an adjustment value Δ, which will be added in the CQI calculation, through the RRC signaling (or MAC CE signaling or DCI signaling). After receiving the adjustment value Δ, the UE may calculate the CQI by adding the adjustment value Δ to the SINR. Alternatively, for the same purpose, the eNB may semi-statically inform the UE of an adjustment value η, which will be used to divide a multi-user interference term in the CQI calculation, through the RRC signaling (or MAC CE signaling or DCI signaling). After receiving the adjustment value η, the UE may calculate the CQI by dividing the multi-user interference term into the adjustment value η in the SINR.

Hereinafter, the third embodiment is described in terms of a power parameter $P_c$ used in the current LTE system. In the current LTE system, the $P_c$ means a ratio of PDSCH EPRE to CSI-RS EPRE and data transmit power can be reflected in the CQI calculation using the $P_C$. According to the third embodiment, each CSI process has its own $P_c$. In addition, data transmit power may be reflected in the CQI calculation using $P_c$ of the CSI process selected for data communication and interference power may also be reflected in the CQI calculation using $P_c$s of the interference CSI processes.

Thus, when transmitting the selected CSI process index to the eNB, the UE can feed back at least one of the RI, PMI, and CQI, which the UE desires to apply in using the CSI process.

Fourth Embodiment

In the third embodiment, the number of CSI processes considered as interference is assumed to be (N–1). However, this is merely for convenience of description and the present invention is not limited thereto. Specifically, the eNB can inform the UE of the number of the CSI processes considered as the interference N'''(N'''≤N−1) through the RRC signaling (or MAC CE signaling or DCI signaling). If there is no separate RRC signaling (or MAC CE signaling or DCI signaling), N''' can be assumed to be (N−1).

When N''' is signaled through the RRC signaling (or MAC CE signaling or DCI signaling), the UE may consider CSI processes having indices/numbers close to (e.g., after and before) the index of the CSI process as interference (e.g., multi-user interference). Among the N CSI processes, indices/numbers close to (e.g., after and before) the last CSI process index/number N are assumed to be (N−1) and 1. If a CSI process to be considered by the UE has an index/number i, (it is assumed that a CSI process index/number starts from 1 and increases sequentially), the interference CSI process can be expressed as shown in Equation 22.

$$\left(\left(i - \left\lceil \frac{N'''}{2} \right\rceil + k\right) \bmod N\right) + 1 \qquad \text{[Equation 22]}$$

(where k has any value among −1, 0, 1, 2, 3, . . . , N''' except 1 or any value among 0, 1, 2, 3, . . . , N''', N'''+1 except 1)

For example, if the eNB informs the UE of four CSI processes, i.e., CSI processes 1, 2, 3, and 4 and sets N''' to 2 and if the UE selects the first CSI process as a CSI process to be used for the corresponding UE, the UE may consider the fourth and first CSI processes as interference. As another example, if the UE selects the second CSI process as the CSI process to be used for the corresponding UE, the UE may consider the first and third CSI processes as interference.

When N''' is signaled through the RRC signaling (or MAC CE signaling or DCI signaling) and a CSI process to be used for data transmission has an index/number i (it is assumed that a CSI process index/number starts from 1 and increases sequentially), the UE can consider N''' CSI processes, i.e., (i mod N)+1, ((i+1) mod N)+1, . . . , ((i+N'''−1) mod N)+1 as interference. For example, if the eNB informs the UE of four CSI processes, i.e., CSI processes 1, 2, 3, and 4 and sets N''' to 2 and if the UE selects the third CSI process as a CSI process to be used for the corresponding UE, the UE may consider the fourth and first CSI processes as interference. As another example, if the UE selects the first CSI process as the CSI process to be used for the corresponding UE, the UE may consider the second and third CSI processes as interference.

In addition, when N''' is signaled through the RRC signaling (or MAC CE signaling or DCI signaling), the eNB may inform the UE which set of CSI processes should be considered as interference through the RRC signaling (or MAC CE signaling or DCI signaling).

Further, When N''' is signaled through the RRC signaling (or MAC CE signaling or DCI signaling), the UE may directly select interference CSI processes and then feed back indices/numbers of the selected interference CSI processes and a CQI where the selected interference CSI processes are reflected.

In the fourth embodiment, the UE may need to calculate the RI, PMI, and CQI in each CSI process to select the CSI process most suitable for the corresponding UE from among the N CSI processes. In this case, the UE may consider the CSI process to be selected as that for a channel for carrying its own data and the other CSI processes as those for channels for carrying data of other UEs. Thereafter, the UE may assume that the other UEs use rank 1 in the N''' CSI processes having indices/numbers except the CSI process index/number to be selected and the worst PMI works as the greatest interference to itself (in addition, the UE can assume that the same power is transferred for the respective CSI processes).

According to the fourth embodiment, when an SINR occurring in actual data transmission may be much greater than that of the CQI calculated by the UE. To adjust it, the eNB may semi-statically inform the UE of an adjustment value Δ, which will be added in the CQI calculation, through the RRC signaling (or MAC CE signaling or DCI signaling). After receiving the adjustment value Δ, the UE may calculate the CQI by adding the adjustment value Δ to the SINR. Alternatively, for the same purpose, the eNB may semi-statically inform the UE of an adjustment value η, which will be used to divide a multi-user interference term in the CQI calculation, through the RRC signaling (or MAC CE signaling or DCI signaling). After receiving the adjustment value η, the UE may calculate the CQI by dividing the multi-user interference term into the adjustment value η in the SINR.

Further, when transmitting the selected CSI process index/number to the eNB, the UE can feed back at least one of the RI, PMI, and CQI, which the UE desires to apply in using the CSI process.

Hereinafter, the present invention is described in terms of a discovery reference signal (DRS).

In general, small cells use a discovery RS (DRS) to measure RSRP from each of the small cells to each UE. That is, in the case of the RSRP using the DRS, average signal power is measured during a long term instead of feeding back CSI during a short time window. According to the current 3D MIMO system, it is known that a vertical beam suitable for a UE is slowly changed over time. Thus, according to the present invention, a UE can calculate a long-term SINR in terms of the vertical beam and then feed back the calculated long-term SINR on the assumption of a multi-user and long-term environment. Thus, when an eNB manages multiple users using the long-term SINR, the eNB can obtain information on which user will be scheduled to which vertical beam from the perspective of the long-term. It could be interpreted to mean that multi-user interference is added to the denominator of RSRQ of the current LTE system. In this case, although the eNB receives DRS-based RSRP from each UE, there may be an error due to feedback quantization compared to the long-term SINR according to the present invention.

Fifth Embodiment

The eNB may inform the UE of several beams through N DRSs (e.g., DRS-CSI-RS configuration) or CSI-RSs and the UE may select a DRS port, DRS index, or CSI-RS port most suitable for the corresponding UE from among N beams. When selecting the DRS port (or DRS index or CSI RS port), the UE may assume that other UEs receive data through other ports (or beams) except the selected DRS port (or DRS index or CSI RS port) and then consider the other ports as interference (e.g., multi-user interference). Thereafter, the UE may calculate the long-term SINR or long-term CQI based on the above-described assumption (in this case, the UE can assume that the same power is transferred through each port (or beam)).

According to the fifth embodiment, when calculating the long-term SINR, the UE may be configured to consider interference from other cells except a serving cell. In this case, the UE may be provided with a separate independent CSI-IM configuration for the corresponding long-term SINR calculation. Through this configuration, the UE may measure interference from the other cells and then reflect the measured interference in the long-term SINR calculation.

In addition, in the fifth embodiment, the number of beams to be considered as interference (e.g., multi-user interference) is assumed to be (N−1). However, the present invention is not limited thereto. Specifically, the eNB can set the number of the beams to be considered as the interference to N'''' (where N''''≤N−1) and then inform the UE of it through the RRC signaling (or MAC CE signaling or DCI signaling) If there is no separate RRC signaling (or MAC CE signaling or DCI signaling), N'''' can be assumed to be (N−1).

When N'''' is signaled through the RRC signaling (or MAC CE signaling or DCI signaling), the UE may consider beams with indices/numbers close to (e.g., after and before) the index of the beam as interference. For example, among the N beams, indices/numbers before and after the last beam index/number N are assumed to be (N−1) and 1. If a beam considered by the UE has an index/number i (it is assumed that a beam index/number starts from 1 and increases sequentially), the interference can be expressed as shown in Equation 23.

$$\left(\left(i - \left\lceil \frac{N''''}{2} \right\rceil + k\right) \bmod N\right) + 1 \qquad \text{[Equation 23]}$$

(where k has any value among −1, 0, 1, 2, 3, . . . , N'''' except 1 or any value among 0, 1, 2, 3, . . . , N'''', N''''+1 except 1)

For example, if the eNB informs the UE of four beams, i.e., beams 1, 2, 3, and 4 and sets N'''' to 2 and if the UE selects the first beam as a beam to be used for the corresponding UE, the UE may consider the fourth and first beams as interference. As another example, if the UE selects the second beam as the beam to be used for the corresponding UE, the UE may consider the first and third beams as interference.

When N'''' is signaled through the RRC signaling (or MAC CE signaling or DCI signaling) and a beam to be used for data transmission has an index/number i (it is assumed that a beam index/number starts from 1 and increases sequentially), the UE can consider N'''' beams, i.e., (i mod N)+1, ((i+1) mod N)+1, . . . , ((i+N''''−1) mod N)+1 as interference. For example, if the eNB informs the UE of four beams, i.e., beams 1, 2, 3, and 4 and sets N'''' to 2 and if the UE selects the third beam as a beam to be used for the corresponding UE, the UE may consider the fourth and first beams as interference (e.g., multi-user interference). As another example, if the UE selects the first beams as the beam to be used for the corresponding UE, the UE may consider the second and third beams as interference.

When N'''' is signaled through the RRC signaling (or MAC CE signaling or DCI signaling), the eNB may inform the UE which set of beams (e.g., DRS ports, DRS indices, CSI-RS ports) should be considered as interference through the RRC signaling (or MAC CE signaling or DCI signaling).

As another method, after a set of beams is designated through the RRC signaling (or MAC CE signaling or DCI signaling), the remaining beams having indices/number except the index/number of the beam to be used for data transmission within the set can be considered as interference. For example, if the N beams are composed of beams 1, 2, 3, 4, 5, 6, 7, and 8, set#1 may include beams 1, 3, 5, and 7 and set#2 may include beams 2, 4, 6, and 8. In this case, if the set#2 is indicated to a certain UE, the UE may select a beam for its data from among the beams 2, 4, 6, and 8 and consider the remaining beams as interference.

When N'''' is signaled through the RRC signaling (or MAC CE signaling or DCI signaling), the UE may directly select interference beams and then feed back information on the selected interference beams and a CQI where the selected interference beams are reflected.

Further, the UE can feed back at least one of the selected DRS configuration index, DRS port index, and CSI-RS port together with the above-described long-term CQI or long-term SINR at the same time.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a channel state information feedback method in a multi-antenna wireless communication system and apparatus therefor are mainly described with reference to examples applied to the 3GPP LTE system, the method and apparatus can be applied to various wireless communication systems as well as the 3GPP LTE system.

What is claimed is:

1. A method for feeding back channel state information (CSI) by a user equipment (UE) in a wireless communication system supporting a 3-dimensional multiple-input multiple-output (3D-MIMO) antenna, the method comprising:
   receiving, through radio resource control (RRC) signaling, information about N beams (where N is a natural number) precoded for specific antennas among multiple antennas constituting the 3D-MIMO antenna and information about a number M of interference beams (where M is a natural number, M≤N−1);
   selecting a specific beam for generating the CSI from among the N beams;
   determining M beams among the remaining beams in descending order of the difference from the index of the specific beam; and
   generating the CSI for the specific beam using the interference determined based on the M beams.

2. The method of claim 1, wherein the N beams are precoded so that the N beams are orthogonal to each other.

3. The method of claim 1, wherein the M beams are determined among beams closest to the specific beam in a vertical direction and beams closest to the specific beam in a horizontal direction.

4. The method of claim 1, further comprising:
   feeding back information about the M beams selected by the UE and the CSI.

5. The method of claim 1, wherein a number of specific beams is determined by rank.

6. A user equipment (UE) for feeding back channel state information (CSI) in a wireless communication system supporting a 3-dimensional multiple-input multiple-out (3D-MIMO) antenna, the UE comprising:
   a radio frequency (RF) unit connected to multiple antennas constituting the full-dimensional antenna; and
   a processor, operatively coupled to the RF unit,
   wherein the processor is configured to:
      receive, through radio resource control (RRC) signaling, information about N beams (where N is a natural number) precoded for specific antennas among the multiple antennas and information about a number M of interference beams (where M is a natural number, M≤N−1),
      select a specific beam for generating the CSI from among the N beams,
      determine M beams among the remaining beams in descending order of the difference from the index of the specific beam, and
      generate the CSI for the specific beam using the interference determined based on the M beams.

* * * * *